H. F. SCHREIBER.
HOOF STEADYING DEVICE.
APPLICATION FILED MAR. 13, 1915.
1,137,090.
Patented Apr. 27, 1915.
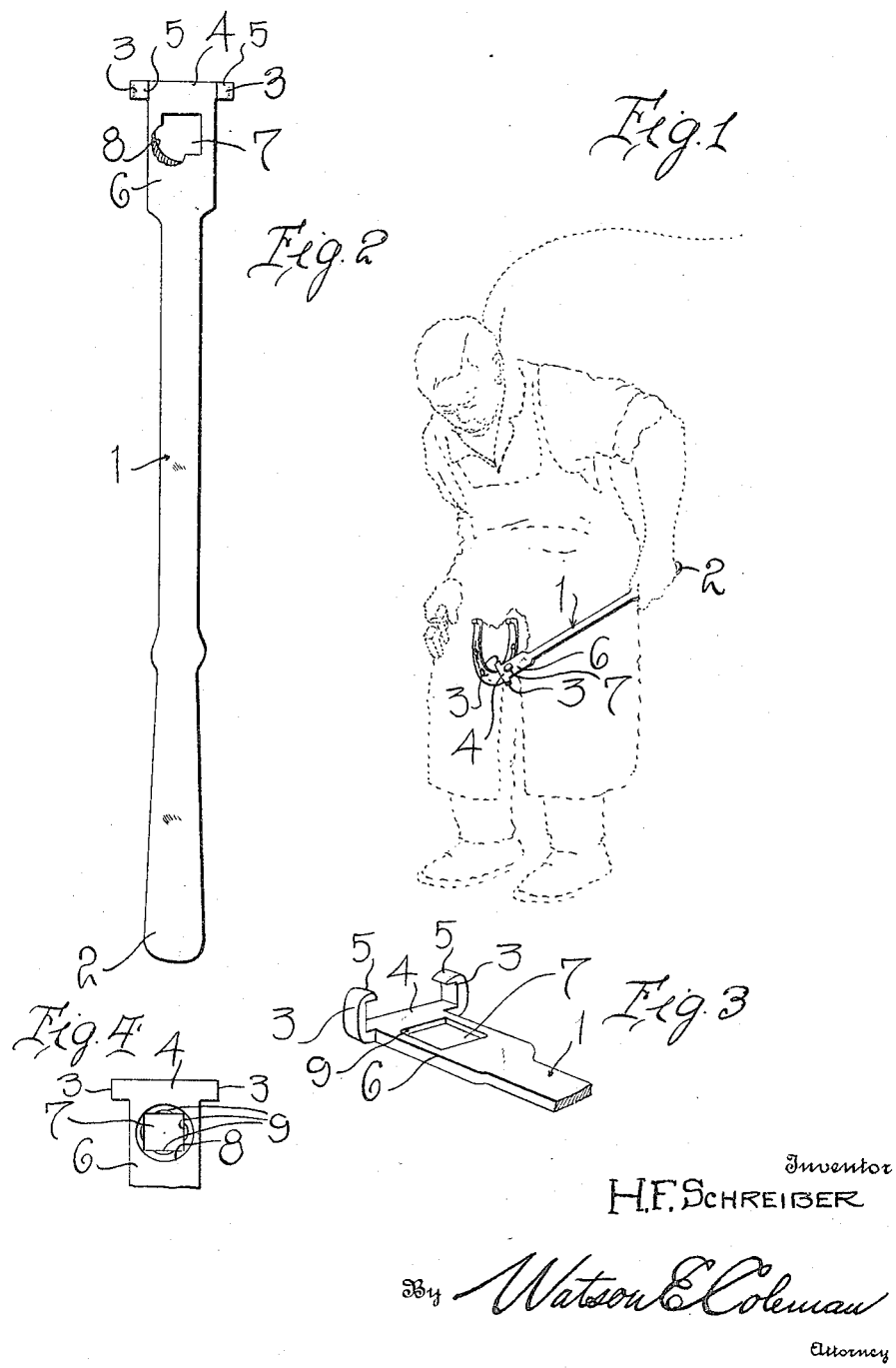
Inventor
H.F. SCHREIBER
By Watson E. Coleman
Attorney

UNITED STATES PATENT OFFICE.

HOWARD F. SCHREIBER, OF NORTHAMPTON, PENNSYLVANIA.

HOOF-STEADYING DEVICE.

1,137,090.   Specification of Letters Patent.   Patented Apr. 27, 1915.

Application filed March 13, 1915. Serial No. 14,139.

*To all whom it may concern:*

Be it known that I, HOWARD F. SCHREIBER, a citizen of the United States, residing at Northampton, in the county of Northampton and State of Pennsylvania, have invented certain new and useful Improvements in Hoof-Steadying Devices, of which the following is a specification, reference being had to the accompanying drawings.

To those familiar with the blacksmith's and farrier's trade, it is well known that the operation of screwing calks in and out of a horseshoe while the latter is on the horse's hoof, is not only difficult, but is liable to injure the horse by straining ligaments, and with a knowledge of these conditions, my present invention has for its primary object a simple, durable, and efficient construction of hoof-steadying device, for use by blacksmiths in fastening in place calks of the screw shank type.

More specifically considered, my present invention has for an object to provide an implement of this kind adapted to be applied to the shoe to steady the same and the hoof, the implement or tool being held by the blacksmith in one hand and up against his body, to steady the shoe and hoof, while with his other hand he holds the wrench that fastens in the calks, the hoof being thereby held steady and prevented from being twisted, thereby precluding all possibility of strained ligaments or similar injuries to the horse. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which, Figure 1 is a view illustrating the application of my device. Fig. 2 is an elevation of the tool with a part broken away. Fig. 3 is a fragmentary perspective view of one end of the tool. Fig. 4 is a face view looking into the socket of the device.

Corresponding and like parts are referred to in the following description and designated in all of the views of the accompanying drawing by like reference characters.

My improved hoof steadying implement consists of a bar 1 of iron or steel, said bar being provided at one end with a handle 2 of any desired construction or design, and formed at its other end with laterally extending fingers 3 which together constitute a transversely extending yoke 4, the free extremities of which are turned inwardly toward each other, as at 5, and terminate in spaced relation to each other, so as to leave a space whereby the yoke 4 may be easily slipped over a horseshoe and secured in such position thereon as to hold the shoe and hoof steady while the calks are being fastened in place.

The head portion 6 of the implement is formed with an opening 7 extending therethrough close to the yoke 4, said opening being shown as square in the present instance, and one side of this opening is defined by a circular socket 8 formed in the relatively outer face of the bar 1 at the head portion 6 thereof, said socket preferably terminating at its base in segmental recesses 9. The opening 7 and the socket 8 which registers therewith, are designed to receive the calk as the same is being screwed up and as the socket extends nearly through to the opposite face of the bar, leaving a very shallow thickness of metal, it will be seen that the calk may be expeditiously screwed into place by a wrench or the like applied thereto, while the hoof steadier is applied to the shoe with the yoke 4 embracing the same, said steadier being held by one hand of the operator and preferably close up to his body, while the other hand applies the wrench. It will thus be seen that I have provided a very simple, durable and efficient construction of hoof steadying implement which may be easily applied and used and which will hold the hoof steady and do much to prevent any injury to the horse by any straining of the ligaments.

While the accompanying drawing illustrates what I believe to be the preferred embodiment of my invention, it is to be understood that the invention is not limited thereto, but that various changes may be made in the construction, arrangements and proportions of the parts without departing from the scope of the invention as defined in the appended claims.

My improved hoof steadier can be used by owners of horses, teamsters and drivers as well as by blacksmiths. The hoof steadier can be used for inserting or removing the "Neverslip" or any other adjustable calk and the hoof can be steadied for taking out the calk just as well as for inserting the calk. In fact, the operation of taking out the calk is more difficult than the insertion of a calk, since the old calk is rusted and is hard to loosen.

What is claimed, is:

1. A hoof steadying implement comprising a bar formed at one end with a handle and at its opposite end with a head terminating in a transversely extending yoke, the ends of which are turned at right angles to the plane of the bar, and then inwardly toward each other whereby the device may be easily applied to a shoe to engage and hold the same, the head portion of the bar being formed with an opening extending therethrough and in one face with a circular socket registering with said opening, as and for the purpose set forth.

2. A hoof steadying implement, comprising a bar formed at one end with a handle and at its opposite end with a head terminating in a transversely extending yoke, the ends of which are turned at right angles to the plane of the bar, and thence inwardly toward each other whereby the device may be easily applied to a shoe to engage and hold the same, the head portion of the bar being formed with an opening extending therethrough and in one face with a circular socket registering with said opening, the base of said socket terminating in segmental recesses.

3. As a new article of manufacture, the herein described hoof steadying implement, consisting of a bar formed at one end with a handle and provided at its other end with a laterally extending yoke formed with inturned extremities adapted to engage a horseshoe, the bar being formed close to said yoke with an opening extending therethrough.

In testimony whereof I hereunto affix my signature in the presence of two witnesses.

HOWARD F. SCHREIBER.

Witnesses:
EDGAR C. NAGLE,
HOWARD H. LAUBACH.

Copies of this patent may be obtained for five cents each, by addressing the "Commissioner of Patents, Washington, D. C."